Oct. 15, 1968 W. J. RICHTER, JR 3,406,265
REPEATER WITH POWER SEPARATION FILTERS AND WITH NEUTRALIZATION NETWORKS CONNECTED TO A COMMON TERMINAL OF SIGNAL AND POWER CHANNELS
Filed Dec. 14, 1964
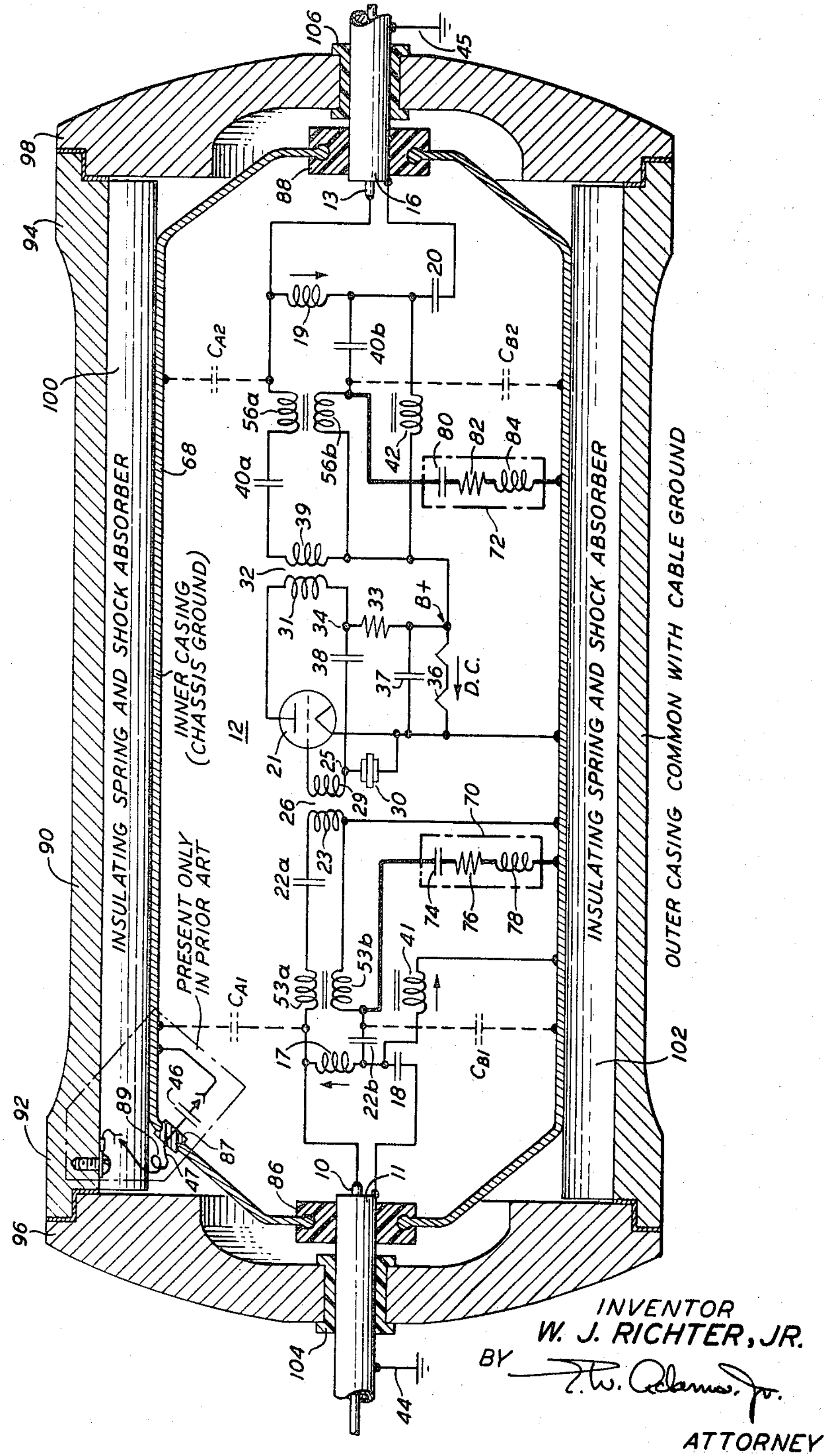
INVENTOR
W. J. RICHTER, JR.
BY [signature]
ATTORNEY United States Patent Office 3,406,265
Patented Oct. 15, 1968

3,406,265
REPEATER WITH POWER SEPARATION FILTERS AND WITH NEUTRALIZATION NETWORKS CONNECTED TO A COMMON TERMINAL OF SIGNAL AND POWER CHANNELS

William J. Richter, Jr., Annandale, Va., assignor to Bell Telephone Laboratories, Incorporated, New York, N.Y., a corporation of New York
Filed Dec. 14, 1964, Ser. No. 417,971
3 Claims. (Cl. 179—170)

ABSTRACT OF THE DISCLOSURE

In a submarine cable repeater in which an inner metallic casing is the signal reference terminal and is isolated from an outer metallic casing which is the ground, or reference terminal, for the repeater power supply, neutralization of spurious feedback through stray and inherent capacitances with respect to the inner casing is achieved by means of first and second neutralizing networks connected from the repeater inner casing to respective points at which the direct-current blocking capacitors of the power separation filters are connected to the coaxial choke coils in the repeater power separation filters. The neutralization networks eliminate the need for any inductive impedances between the inner and outer casings, thereby reducing the amount of change in repeater characteristics which occurs when the separation between inner and outer casings changes, for instance, under impact.

This invention relates to a communication repeater having signal and power both supplied from a common transmission line and to an arrangement of neutralization networks for such a repeater.

Signal repeaters are frequently remotely located along a communication line. For example, in a submarine cable system, the repeaters are remotely located at the bottom of the ocean at periodic intervals along the cable. It is well known that local sources of power for the repeaters are not generally available. This unavailability of local power for the repeaters also applies to some relatively long overland communication lines.

In the aforementioned submarine cable and overland communication systems, it has heretofore been found desirable to supply operating power to the repeaters by means of a direct-current in the line which is regulated at the line terminals to be substantially constant. The constant direct current is commonly carried in the same conductors that carry the communication signals and thus experience a signal voltage variation with respect to earth or sea ground, and a power separation filter precedes each repeater in order to feed the signal to the repeater through a signal channel and to feed the power to the repeater through a power channel. Following each repeater another so-called power separation filter recombines the amplified signal and the direct-current, which now has a different potential level with respect to earth or sea ground. A result of this arrangement is that the power supply circuits of successive repeaters are connected serially with one another.

The practical requirements of such a repeater result in the use of two repeater casings, the inner one being the chassis and a common terminal of both the signal and power channels, and the outer one being a reference terminal within the power channel at earth or sea ground. Although the same direct-current voltage is supplied to the amplifying circuit of each repeater from its power supply circuit, the direct-current voltage between the inner casing, or chassis, and earth or sea ground varies from a very high voltage at either end of the communication system to a relatively small voltage at the median repeater. In fact, it is this direct voltage variation that makes the outer casing necessary. The presence of the two casings inevitably results in a large number of spurious signal paths. An excellent arrangement adapted to block some of these spurious signal paths is disclosed in United States Patent 3,105,125 of J. J. Kassig, issued Sept. 24, 1963, and assigned to the assignee hereof.

It has been found that as transmission frequencies increase, ranging up to six megacycles per second, more spurious signal paths become troublesome and can produce substantial frequency distortion. In particular, applicant has recognized that in some circumstances certain stray capacitances feed a frequency-dependent spurious signal from the output of the repeater to the input of the repeater, in part through the alternating-current impedance between the two repeater casings.

An important part of this spurious feedback path includes a signal bypass capacitor connected between the metallic casings of the repeater. This capacitor has a long lead of substantial inductance. Moreover, particularly when the metallic casings are separated by insulating resilient shock-absorbing members that flex in response to impact upon or vibration of the repeater, the spatial arrangement and inductance of the long lead of the bypass capacitor change and produce a variability of the frequency distortion caused by the spurious feedback path. The bypass capacitor also is the cause of other practical problems and disadvantages such as high cost, temperature sensitivity and the requirement of an additional electrically insulating vapor seal in the repeater inner casing. Moreover, the lead inductance of the signal bypass capacitor antiresonates with the distributed capacitance between the repeater casings at a frequency of about fifteen megacycles per second, well beyond the upper limit of the signal frequency band but causing feedback of such magnitude that a near oscillation occurs; that is, component aging or other changes may cause oscillation to occur.

Therefore, it is an object of this invention to reduce the effect of the above-described spurious feedback path in a simple and effective manner.

Another object of the invention is to neutralize spurious feedback in a repeater that is supplied with signals and power from a common transmission line.

Still another object of the invention is to reduce or eliminate the practical disadvantages of the signal bypass capacitor connected between relatively movable casings of such a repeater.

According to the invention, the foregoing objects are achieved by connecting first and second neutralizing networks from the repeater inner casing to respective points in the input and output signal channels, which points are electrically remote from the repeater inner casing. The two networks together can be called a split neutralization network that has an intermediate point connected to the inner casing.

The invention is preferably used in conjunction with the invention described in the above-cited patent of J. J. Kassig, so that the Kassig invention reduces the effect of some stray capacitances, while the present invention reduces the effect of other stray capacitances.

An unexpected result of the invention is that the troublesome bypass capacitor connected between the repeater casings can now be, and is preferably, entirely removed from the repeater.

Other features and advantages of the invention will become apparent from the following detailed description and the drawing in which the figure is a partially pictorial and partially schematic illustration of the preferred embodiment of the invention and a superimposed signal bypass circuit required in the prior art but not required by the invention.

Since the preferred embodiment of the invention involves an improvement upon the circuit disclosed in the above-cited patent to J. J. Kassig, components in the present drawing have been labeled with the same numbers as the corresponding components in FIG. 2 of the above-cited patent. The directional filter apparatus of FIG. 2 of the above-cited patent has been omitted from the drawing because it is not relevant to the present invention.

In the repeater system shown in the drawing, input terminals 10 and 11 represent the two conductors of a coaxial cable supplying an amplifying circuit which is generally designated as 12; and the output of amplifying circuit 12 is applied to the two conductors of a further section of cable, represented by the output terminal 13 and 16.

Electrical energy supplied to the amplifying circuit 12 from terminals 10 and 11 includes signals which may range in frequency up to about six megacycles per second as well as direct-current operating potentials. A coil 17 and a capacitor 18 are connected in series between the terminals 10 and 11 to constitute a power separation filter, or potential divider, for separating the signal and the direct-current operating energies in a well-known manner. A similar coil 19 and a capacitor 20 are connected in series between the output terminals 13 and 16 to combine the amplifier output signals and operating energy for transmission to the next repeater. In order to simplify the illustration, circuit elements for only one direction of transmission, i.e., west to east, are shown; and the multistage amplifier of the repeater is schematically represented by the single stage amplifying circuit 12, including triode 21.

The repeater system includes a signal channel that is connected through the amplifying circuit 12 as follows. Signal frequency potentials are developed primarily across the coil 17 and are coupled through blocking capacitors **22*a* and 22*b* and through coaxial choke coils 53*a* and 53*b* to the primary winding 23 of an input transformer 26. It is noted that the blocking capacitor 22*a* is connected on the output rather than the input side of coil 53*a* to reduce the stray capacitance $C_{A1}$ that the wiring between center conductor 10 and coil 53*a* produces with respect to the repeater inner casing 68. The blocking capacitor 22*b* is connected directly to the junction of coil 17 and capacitor 18** because the stray capacitance $C_{B1}$ causes less parasitic feedback distortion than $C_{A1}$.

The secondary winding 29 of the transformer 26 is connected between the input control grid and the cathode of a triode 21 via a piezoelectric crystal 30. Resonant devices such as crystal 30 are often included in inaccessible repeaters to inject an irregularity in the gain-versus-frequency characteristic of the repeater at a so-called signature frequency which lies outside of the regular signal frequency band. This signature frequency irregularity is employed to check the operating condition of the repeater.

The output circuit of triode 21 is connected between the anode and cathode thereof and includes the primary winding 31 of a coupling transformer 32, a feedback controlling impedance represented by resistor 33, and the total resistance of the series-connected heaters 36 of the various cascaded electron tubes of which electron tube 12 is representative in the repeater system shown in the drawing.

The operating power path for the amplifying circuit 12 is arranged so that direct-current will flow between terminals 10 and 13 via coil 17 and a first high impedance choke coil 41 from the repeater inner casing 68 and to repeater inner casing 68 via the heaters 36, a second choke coil 42 and the coil 19. The direct-current circuit for the operating power is provided in a similar manner through subsequent sections of cable and through subsequent repeaters. It may therefore be appreciated that the power supply circuits of all of the repeaters are in series. The grounding connections 44 and 45 for the outer cable conductors 11 and 16 are typically exposed to the sea, in the case of a submarine cable; or are buried in the earth in the case of a long land line. In either case, the entire repeater outer casing, comprising metallic parts 90, 92, 94, 96 and 98 is electrically common with the outer conductors 11 and 16 and their ground connections. The direct-current return path is provided through the earth or the sea between some ultimate terminals, not shown, of the communication system.

Instead of a vacuum tube amplifying circuit 12, a transistorized multistage amplifier might be connected as described in the copending application of S. T. Brewer et al., Ser. No. 312,119, filed Sept. 27, 1963, now Patent No. 3,254,303, issued May 31, 1966, and assigned to the assignee hereof. In this case, the circuit connected between points A and B in FIG. 1 of the cited copending application performs the amplifier biasing that is herein represented by the series connected heaters 36 and the capacitor 37. In either event, the operating energy, which is usually supplied at the ends of the cable as a substantially constant direct-current, is made available as a substantially constant direct-current biasing voltage for the amplifying circuit 12. This biasing voltage is symbolically represented by the $B^+$ label at junction of the resistances 36 and 33. Triode 21 is thus supplied with the anode-cathode potential necessary for operation.

A capacitor 38 is connected between a terminal 34 of primary winding 31 and a terminal 25 of secondary winding 29 to provide a gain-correcting negative feedback from the output circuit to the input circuit of triode 21. The secondary winding 39 of output transformer 32 is connected via the direct-current blocking capacitors **40*a* and 40*b* and coaxial choke coils 56*a* and 56*b* to the terminerals of the coil 19. Capacitor 40*a* is connected between winding 39 and choke coil 56*a* to reduce the stray capacitance $C_{A2}$ that exists between the repeater inner casing 68, or chassis on the one hand, and the wiring from the choke coil 56*a* to the center conductor 13, on the other hand. The capacitor 40*b* is connected between choke coil 56*b* and the coil 19 because the stray capacitance $C_{B2}$ that exists between the repeater inner casing 68 and the wiring following choke coil 56*b* causes less parasitic feedback distortion than $C_{A2}$, provided the junction of winding 39 and coil 56*b* is connected to $B^+$, as shown, or to the inner casing 68**.

In the prior art system disclosed in the above-cited patent of J. J. Kassig, a capacitor 46 is connected between the inner casing 68 and the relatively thick end flange 92 of the outer casing. This has been considered desirable because the above-cited connections establish the inner casing 68 and the outer casing 92–98 as terminals between which a low signal-frequency impedance should appear if signal frequency feedback around amplifying circuit 12 is to be minimized. It is noted that the signal channel is connected through coaxial choke coils **53*a* and 53*b* to the grid of tube 21 and to the inner casing 68, so that the inner casing 68 is a reference terminal for the signal channel. Likewise, the output signal is coupled through coaxial choke coils 56*a* and 56*b* from transformer winding 39, one terminal of which is connected via capacitor 37 to inner casing 68** for signal frequencies.

Further explanation of the characteristics of the signal and power channels and their relationships may be found in the above-cited patent to J. J. Kassig. It suffices for present purposes to explain that capacitor 46 is not an ideal way to solve the problem of signal feedback through a spurious path including the alternating-current impedance between the two repeater casings. In the first place, this signal bypass between the two repeater casings is not broadband because capacitor 46 will most effectively bypass signals between the casings at the in-band frequency at which it resonates with its inherent lead inductance, which inductance is symbolized by the one-turn coil 89. At all other in-band frequencies the capacitor 46, the conductor 47 and the inherent capacitance (not shown) between the inner casing 68 and the outer casing 90–98 produce capacitive or inductive impedances of various magnitudes between the casings. As mentioned hereinbefore, the inherent inductance 89 of conductor 47 antiresonates with the aforesaid inherent capacitance between the inner and outer casings at a high frequency outside of the signal band, so that sustained oscillation may occur as various components age.

A signal feedback path is completed by this bypass impedance in the following manner. The output signal that appears between conductors 13 and 16 also appears across the stray capacitance $C_{A2}$ and the impedance between inner casing 68 and outer casing 90–98. This impedance consists of capacitor 46 and its lead inductance 89 in shunt with the inherent capacitance between inner casing 68 and outer casing 90–98, as well as some less significant impedances. The portion of the voltage appearing between inner casing 68 and outer casing 90–98 is applied across stray capacitance $C_{A1}$ and conductors 10 and 11 as a voltage-divider. The impedance between conductors 10 and 11 is substantially determined by the input impedance of the amplifying circuit 12 in parallel with the impedance seen looking into the cable toward the preceding repeater. Obviously, any feedback signal appearing between terminals 10 and 11 will cause current to flow through components **53*a*, 22*a*, 23, 53*b*, 22*b* and 18, producing a signal at the input of amplifying circuit 12. The resulting parasitic signal feedback is strongly frequency dependent and produces an objectionable amount of frequency distortion at the output of amplifying circuit 12**.

While the capacitor 46 and lead 89 provide a low impedance between the two casings at in-band frequencies a vapor seal 87 is needed, through which connection is made between capacitor 46 and the outer casing of the repeater. The vapor seal 87 protects amplifying circuit 12 from water vapor in case diffusion or slow leaks through high-pressure seals 104 and 106 should take place, or in case the copper-beryllium outer casing section 90 or the joints, such as that between sections 92 and 96 should spring relatively slow vapor leaks. Vapor seal 87 also insulates the conductor 47 from the inner casing 68, since these two conductors have a large direct-current potential difference between them.

Still another disadvantage of the use of capacitor 46 is that the relatively long connection from it to the outer casing section 92 can change shape and, therefore, inductance. This variability of inductance is caused by the fact that the amplifying circuit 12 must be protected against physical impact and vibration. This protection is provided by the spring and shock-absorber devices 100 and 102, and additional such devices not shown. These devices are composed of an insulating material and are shaped like Venetian blind slats having edges resting against the outer casing section 90 and having their curved central portions touching the inner casing 68. A large number of such devices supports inner casing 68 from all sides.

As these devices 100 and 102 flex in response to an external physical impact upon the outer casing, the effective lead inductance 89, changes by a substantial amount because the spatial configuration of the conductor 47 changes by a substantial amount. It is noted that conductors 10, 11, 13 and 16 must also have some slack, but their coaxial configuration prevents a variation of impedance as the devices 100 and 102 flex. Nevertheless, conductor 47 cannot be connected directly to outer conductor 11 because of the very substantial inductance that outer conductor 11 has from its junction with capacitor 18 to the cable or system ground 44. If conductor 47 were connected to junction of outer conductor 11 and capacitor 18, there would be increased feedback coupling of output and input circuits. The explanation for the increased feedback that would occur is complex; but it can be stated that the effect would be approximately the same as if the inductance 89 of conductor 47 were trebled.

In the preferred embodiment of the invention, capacitor 46, conductor 47, and vapor seal 87 are eliminated by connecting a neutralizing network 70 from the input terminal of coaxial choke coil **53*b* to the repeater inner casing 68 and by connecting a neutralizing network 72 from the output terminal of coaxial choke coil 56*b* to inner casing 68. Network 70 comprises a capacitor 74, a resistor 76, and an inductor 78 connected in series. Network 72 comprises a capacitor 80, a resistor 82, and an inductor 84 connected in series. Neutralizing networks 70 and 72 are adapted to be frequency-dependent in a manner analogous to the frequency dependence of the spurious feedback path through stray capacitances $C_{A2}$ and $C_{A1}$, capacitor 46 and its lead inductance 89. Neutralizing networks 70 and 72 are adjusted until the neutralizing signal is equal in magnitude and one hundred eighty degrees out of phase with the spurious feedback signal at the input of triode 21. The provision of two neutralizing networks connected as shown permits an unusually simple and effective neutralizing arrangement for repeaters having signal and power channels that are supplied from a common line and, in addition, permits the removal of bypass capacitor 46** and the elimination of the variable inductance and vapor seal problems caused by its use.

In the operation of the repeater shown in the drawing, coaxial choke coils **56*a* and 56*b* have nearly a unity coefficient of mutual coupling and are oriented to present negligible impedance to signal currents that flow through both coils via any closed current loop. Thus, to the extent that a signal current flows from winding 39 through coil 56*a* and stray capacitance $C_{A2}$ to inner casing 68, and thence through the alternating-current impedance between the inner casing 68 and the outer casing 90–98, a nearly equal current will flow in part through the alternating-current impedance between the inner and outer casings, then from casing 68, through stray capacitance $C_{B2}$ and neutralizing network 72 in parallel, and in part through outer conductor 16, capacitor 20 and capacitor 40*b*, and then in its entirety through coil 56*b* to winding 39. Network 72 carries the major portion of this current to winding 56*b*. Thus, the current through network 72 is nearly equal and opposite to that through stray capacitance $C_{A2}$ and may be called a neutralizing current. The result of this neutralizing current is that the signal voltage appearing between inner casing 68 and the outer casing 90–98** is substantially reduced.

However, it is found that some residual signal variation still appears between the inner and outer repeater casings. As explained hereinbefore, this signal between the casings is applied across the stray capacitance $C_{A1}$ and terminals 10 and 11 as a voltage divider, part of the spurious signal current flowing through the impedance presented by the coaxial cable and the other part flowing through coaxial coil **53*a* capacitor 22*a*, winding 23, coaxial coil 53*b*, capacitors 22*b* and 18 and the lead inductances of the latter capacitors. Nevertheless, at the same time, the signal between the repeter inner casing 68 and the outer casing 90–98 is also applied across neutralizing network 70 and capacitors 22*b* and 18 and their lead inductances as a voltage divider. Part of the signal current that flows through network 70 then flows through capacitors 22*b* and 18 and their lead inductances, and the other part of the signal current that flows through network 70 flows through coil 53*b*, winding 23, capacitor 22*a* and winding 53*a* and the impedance presented by the cable in a sense to neutralize the current flowing in winding 23 from stray capacitance $C_{A1}$. Since the ratio of the foregoing two parts of the current is fixed at any given frequency, effective neutralization is achieved by shaping the total current from network 70 with respect to frequency. Variation of the three series components, capacitor 74, resistor 76 and inductor 78** gives good results for a fairly broad band of frequencies.

Since networks 72 and 70 form a network stretching from output to input of the amplifying circuit 12, but nevertheless are joined at the signal reference terminal 68 of amplifying circuit 12, they may be said to comprise a split neutralization network. That is, they are split by the signal reference terminal 68.

In all other respects the operation of a repeater according to the present invention is similar to the operation of a repeater according to FIG. 2 of the above-cited patent of J. J. Kassig.

The invention can be applied to a variety of different repeaters, for example, the repeater disclosed in the above-cited copending application of S. T. Brewer et al.

What is claimed is:

1. A communication repeater comprising power and signal channels, a first metallic casing forming a common terminal of said power and signal channels, a second metallic casing enveloping said first metallic casing and forming a reference terminal within said power channel, first and second pairs of coaxial choke coils serially connected in said signal channel, the members of each pair being mutually coupled to present negligible impedance to signal currents flowing through both said members, first and second particular members of said first and second pairs of coils respectively having signal reference connections to said common terminal, an amplifying device coupled in said signal channel between said first and second pairs of choke coils and having a signal reference connection to said common terminal, and first and second neutralization networks coupled from said first metallic casing to first and second respective points in said signal channel separated from said common terminal by said first and second particular members of said first and second respective pairs of coaxial choke coils, said networks being adapted to neutralize said repeater for signal feedback through parasitic capacitances between said signal channel and said first casing.

2. A communication repeater according to claim 1 in which the first and second neutralization networks each include resistance, capacitance and inductance connected in series.

3. A communication repeater according to claim 1 including resilient insulating shock-absorbing devices separating the first metal casing from the second metal casing, said repeater having only inherent capacitive impedance between said first and second casings, and including first and second direct-current locking capacitors connected serially in the signal path directly to the respective first and second particular choke coil members, the points of connection of the first and second neutralization networks respectively to said particular members being the respective points of connection of said blocking capacitors and said particular members, said neutralization networks being adapted primarily to neutralize said repeater for signal feedback through parasitic capacitances between the respective others of said pairs of choke coils and said first casing.

References Cited

UNITED STATES PATENTS

| | | | |
|---|---|---|---|
| 2,170,645 | 8/1939 | Peterson | 330—77 |
| 2,253,189 | 8/1941 | Mechling | 333—25 |
| 2,294,328 | 8/1942 | Aldous | 330—65 |
| 2,802,909 | 8/1957 | Foster et al. | 325—436 |
| 3,105,125 | 9/1963 | Kassig | 179—170 |

KATHLEEN H. CLAFFY, *Primary Examiner.*

R. LINN, *Assistant Examiner.*